United States Patent
Li et al.

(10) Patent No.: US 8,720,837 B2
(45) Date of Patent: May 13, 2014

(54) SUPPORT FRAME FOR ELECTRONIC DEVICE

(75) Inventors: Wu-Qi Li, Shenzhen (CN); Wu-Zhu Hu, Shenzhen (CN); Tang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/557,938

(22) Filed: Jul. 25, 2012

(65) Prior Publication Data
US 2013/0126688 A1 May 23, 2013

(30) Foreign Application Priority Data
Nov. 18, 2011 (CN) .......................... 2011 1 0367944

(51) Int. Cl.
F16M 11/02 (2006.01)

(52) U.S. Cl.
USPC .................... 248/188.6; 248/163.1; 248/181.2

(58) Field of Classification Search
USPC ........... 248/177.1, 163.1, 166, 434, 435, 168, 248/170, 173, 188, 188.1, 188.6, 178.1, 248/185.1, 183.2, 370, 371, 181.1, 181.2, 248/282.1, 917, 919, 920, 921, 922, 923
See application file for complete search history.

(56) References Cited

U.S. PATENT DOCUMENTS

| | | | | |
|---|---|---|---|---|
| 3,115,849 A * | 12/1963 | Johnson | ............................ | 108/4 |
| 6,579,017 B2 * | 6/2003 | Wei | ................. | 396/428 |
| 7,290,740 B2 * | 11/2007 | Joy et al. | ..................... | 248/187.1 |
| 7,744,048 B1 * | 6/2010 | McKellery et al. | ........ | 248/177.1 |
| 7,918,427 B2 * | 4/2011 | Wang | ......................... | 248/278.1 |
| D666,205 S * | 8/2012 | Li et al. | ........................ | D14/452 |
| 2007/0090237 A1 * | 4/2007 | Hsu | ................. | 248/178.1 |
| 2007/0131825 A1 * | 6/2007 | Skrodzki | ..................... | 248/177.1 |

FOREIGN PATENT DOCUMENTS

| | | |
|---|---|---|
| CN | 201982901 U | 9/2011 |
| CN | 201992303 U | 9/2011 |

* cited by examiner

*Primary Examiner* — Steven Marsh
(74) *Attorney, Agent, or Firm* — Novak Druce Connolly Bove + Quigg LLP

(57) ABSTRACT

A support frame for supporting an electronic device includes a fixing base for grasping the electronic device, two support assemblies, an angle adjusting mechanism connecting the fixing base to the support assemblies, and an adjusting plate. The angle adjusting mechanism includes a connecting member, a mating member, and an adjusting assembly. The connecting member is connected to the support assembly. The adjusting assembly includes an adjusting shaft and an adjusting cap engaged with the adjusting shaft. The connecting member and the mating member are sleeved on the adjusting shaft. The adjusting plate is sleeved on the adjusting shaft, and positioned between the connecting member and the mating member.

16 Claims, 4 Drawing Sheets

SUPPORT FRAME FOR ELECTRONIC DEVICE

BACKGROUND

1. Technical Field

The present disclosure generally relates to support frames, and particularly, to a support frame for electronic device.

2. Description of the Related Art

Portable electronic devices, such as a tablet computer or a portable navigation system, can be positioned in a car using a supporting frame at any given time. However, the support frame installed in the car cannot be adjusted, so that a user cannot get a better viewing angle of the portable electronic devices.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
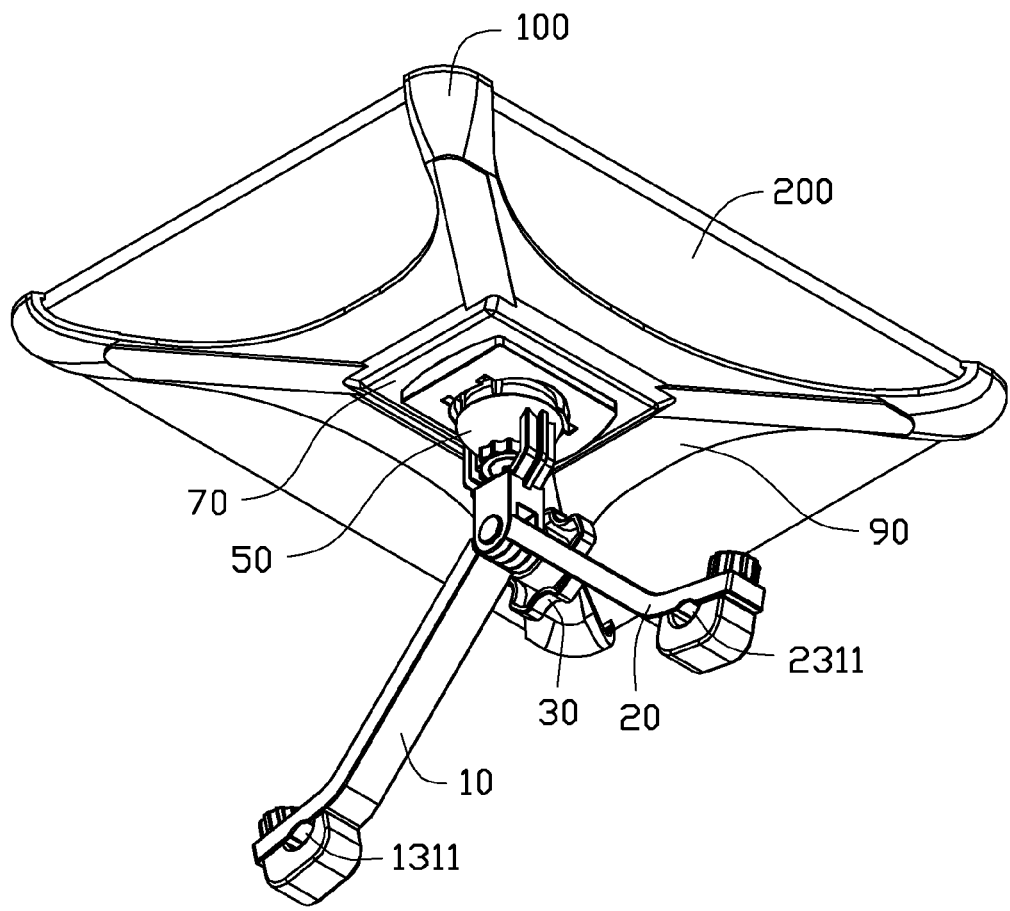
FIG. 1 is an isometric, assembled view of an embodiment of a support frame having a first support assembly and a second support assembly for supporting an electronic device.
Figure 2:
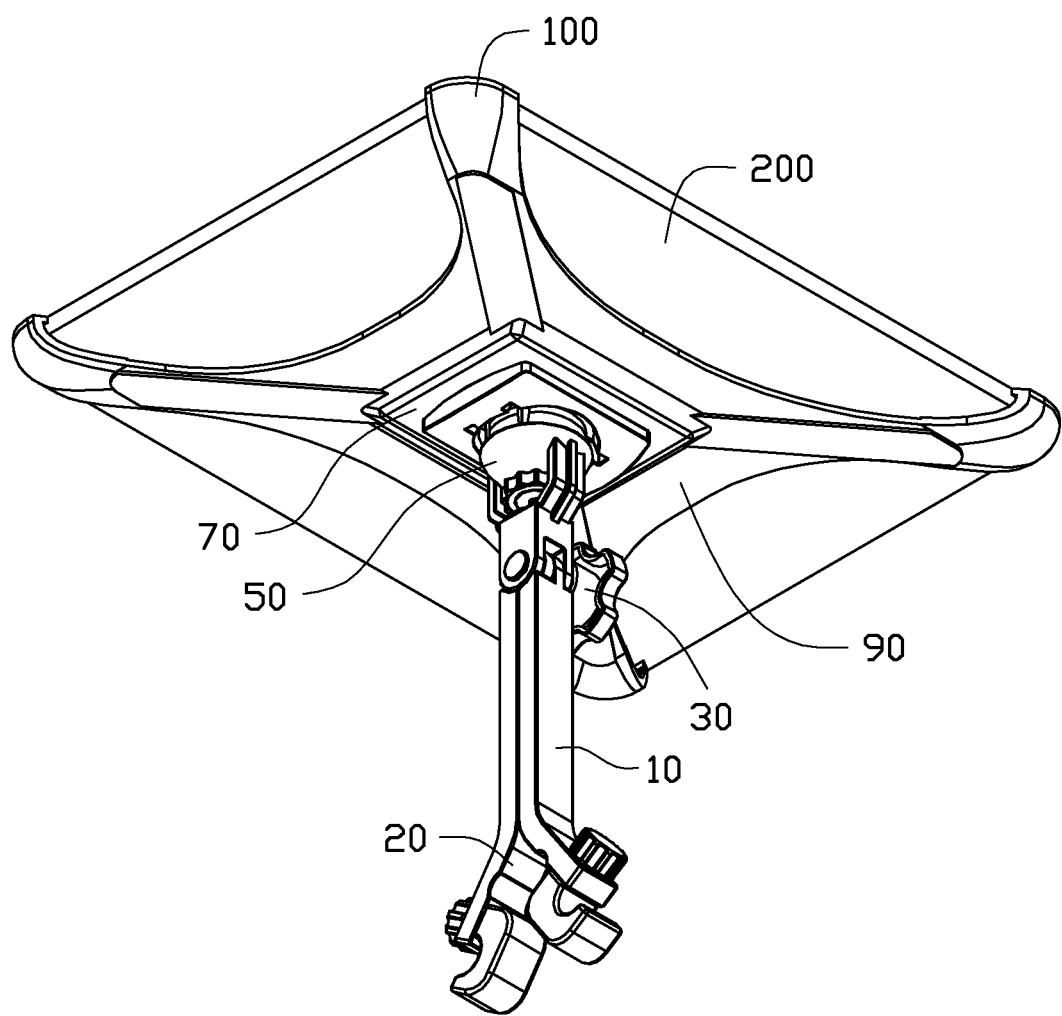
FIG. 2 is similar to FIG. 1, but the first support assembly and the second support assembly close to each other.

Referring to FIG. 1, an embodiment of a support frame 100 is used for fixing and supporting an electronic device 200. The support frame 100 includes a first support assembly 10, a second support assembly 20, a pivot assembly 30, an angle adjusting mechanism 50, an adjusting plate 70, and a fixing base 90. The first support assembly 10 is rotatably connected to the second support assembly 20 via the pivot assembly 30. The angle adjusting mechanism 50 is connected to the second support assembly 20 and the first support assembly 10 via the pivot assembly 30. The adjusting plate 70 is movably connected to the fixing base 90 via the angle adjusting mechanism 50. The fixing base 90 is uses for fixing the electronic device 200. In an illustrated embodiment, the electronic device 200 is a portable navigation system.

Figure 3:
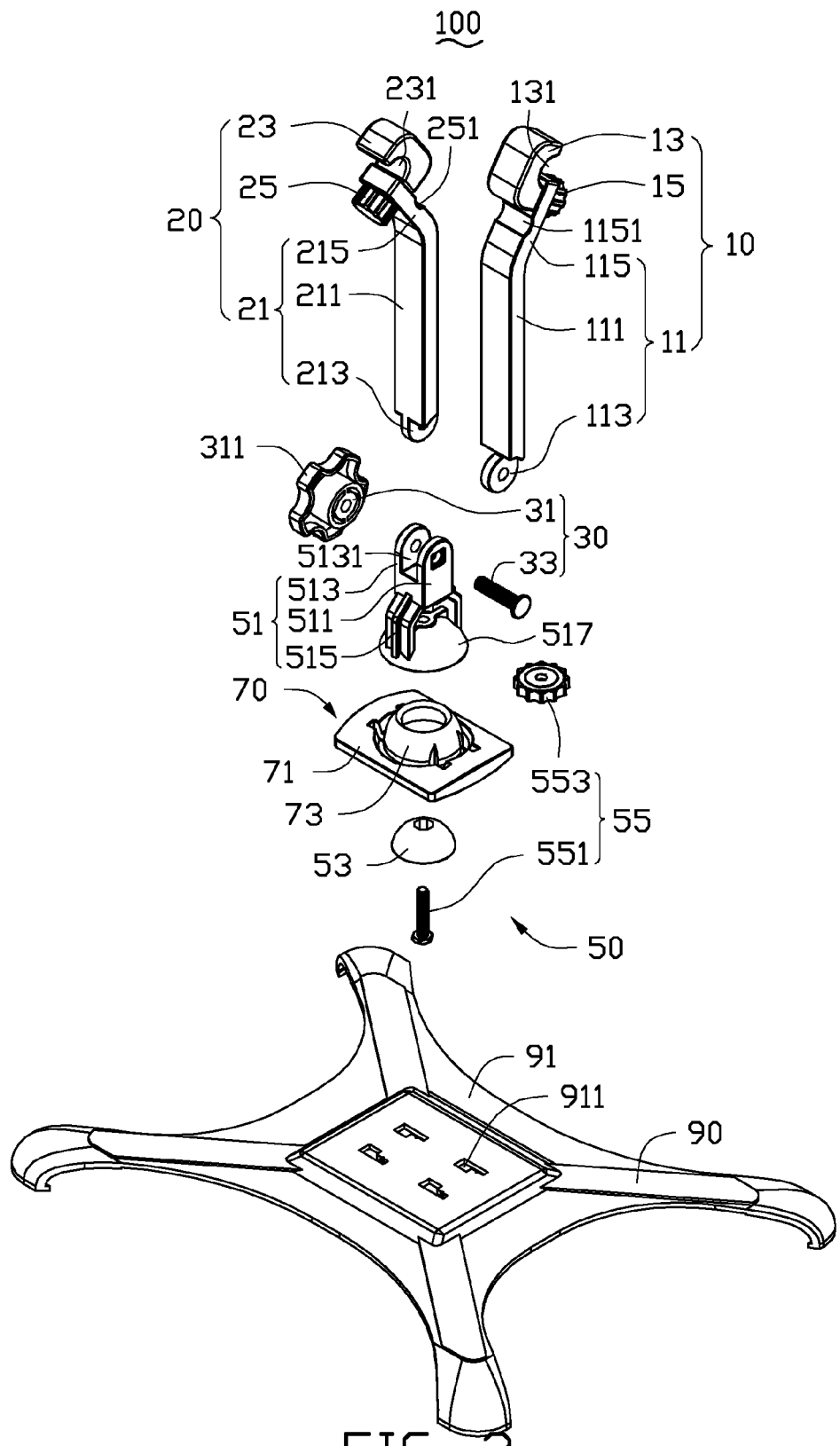
FIG. 3 is an isometric, exploded view of the support frame of FIG. 1.
Figure 4:
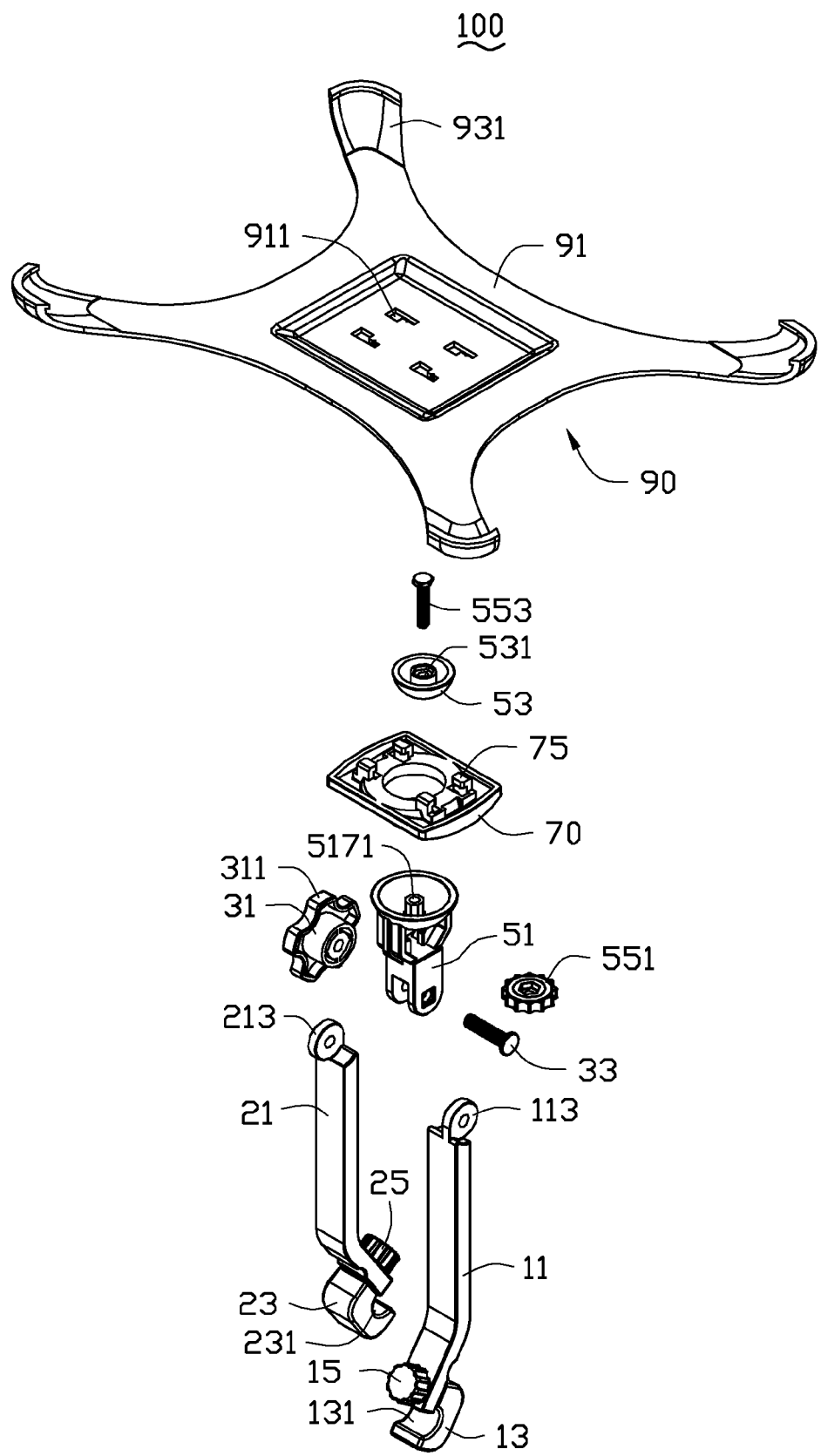
FIG. 4 is similar to FIG. 1, but viewed from another aspect.

Referring to FIGS. 3 and 4, the first support assembly 10 includes a first support member 11, a first grasping member 13, and a first adjusting member 15. The first support member 13 includes a main portion 111, a hinge portion 113, and an assembly portion 115. The hinge portion 113 and the assembly portion 115 are formed on opposite ends of the main portion 111. The assembly portion 115 defines a first assembly groove 1151 in a middle portion. The first grasping member 13 is rotatably mounted on the assembly portion 115 via the first adjusting member 15. The first grasping member 13 is substantially rectangular, and defines a second assembly groove 131. The first grasping member 13 can be rotated relative to the assembly portion 115, so that the second assembly groove 131 is opposite to the first assembly groove 1151 to cooperatively form a grasping groove 1311 (see FIG. 1), and then the first grasping member 13 is fastened to the assembly portion 115 tightly via the first adjusting member 15.

The second support assembly 20 has a similar structure as the first support assembly 10. The second support assembly 20 includes a second support member 21, a second grasping member 23, and a second adjusting member 25. The second support member 21 includes a main portion 211, a hinge portion 213, and an assembly portion 215. The hinge portion 213 and the assembly portion 215 are formed on opposite ends of the main portion 211. The assembly portion 215 defines a first assembly groove 2151 in a middle portion. The second grasping member 23 is rotatably mounted on the assembly portion 215 via the second adjusting member 25. The first grasping member 13 is substantially rectangular, and defines a second assembly groove 131. The second grasping member 23 can be rotated relative to the assembly portion 215, so that the second assembly groove 231 is opposite to the first assembly groove 2151, thereby cooperatively forming a grasping groove 2311 (see FIG. 1), and then the second grasping member 23 is fastened to the assembly portion 215 tightly via the second adjusting member 25.

The pivot assembly 30 includes an operating member 31 and an adjusting pole 33. The operating member 31 forms a plurality of protrusions 311 along a periphery of the operating member 31. In the illustrated embodiment, the adjusting pole 33 is a screw.

The angle adjusting mechanism 50 includes a connecting member 51, a mating member 53, and an adjusting assembly 55. The connecting member 51 includes a base portion 511, a connecting portion 513 and a support portion 515 extending from opposite ends of the base portion 511. The connecting portion 513 defines a receiving groove 5131 for receiving the hinge portions 113, 213. The adjusting pole 33 extends through the connecting member 51, the hinge portions 113 of the first support assembly 10, the hinge portions 213 of the second support assembly 20, and engages with the operating member 31.

The adjusting pole 33 extends through the connecting member 51, the hinge portion 113 of the first support assembly 10, the hinge portion 213 of the second support assembly 20, and fixed to the operating member 31. Therefore, the first support assembly 10 and the second support assembly 20 are rotatably connected to the connecting member 51. The support portion 515 is substantially U-shaped, and a restricting end 517 is connected to the support portion 515. The restricting end 517 is substantially hollow semi-spherical, and forms a hollow cylindrical positioning protrusion 5171. The mating member 53 is also substantially hollow semi-spherical, and a diameter of the mating member 53 is smaller than a diameter of the restricting end 517. The mating member 53 forms a hollow positioning pole 531 sleeved on the positioning protrusion 5171.

The adjusting assembly 55 includes an adjusting shaft 551 and an adjusting cap 553 engaged with the adjusting shaft 551. The adjusting shaft 551 extends through positioning pole 531 of the mating member 53, the restricting end 517, and is threaded with the adjusting cap 553. The adjusting plate 70 is positioned between the mating member 53 and the connecting member 51. The adjusting plate 70 includes a main body 71, a positioning portion 73, and a plurality of hook portions 75, in which the positioning portion 73 and the hook portions 75 extend from opposite sides of the main body 71. In the illustrated embodiment, the adjusting plate 70 has four hook portions 75.

The fixing base 90 include a base body 91 and four grasping portions (not labeled) extending from an edge of the base body 91. A center portion of the base body 91 defines four engaging holes 911 for receiving the hook portions 75 of the adjusting plate 70. The grasping portions cooperatively hold the electronic device 200. In the illustrated embodiment, each grasping portion forms a curve surface 931 in an end away from the base body 91, thereby mating with the electronic device 200.

Referring to FIGS. 1 through 4, in assembly of the support frame 100, the adjusting pole 33 extends through the connecting portion 513, the hinge portions 113 of the first support assembly 10, the hinge portions 213 of the second support assembly 20, and engages with the operating member 31. The adjusting plate 70 is positioned between the connecting member 51 and the mating member 53. The adjusting shaft 551 extends through positioning pole 531 of the mating member 53, the positioning portion 73 of the adjusting plate 70, the positioning protrusion 5171 of the connecting member 51, and engages with the adjusting cap 553. The hook portions 75 of the adjusting plate 70 engage into the engaging holes 911 of the fixing base 90. After the support frame 100 is assembled, the electronic device 200 is grasped by the fixing base 90.

In use, the operating member 31 is rotated to loosen the first support assembly 10 and the second support assembly 20 from connecting member 51. An angle between first support assembly 10 and the second support assembly 20 is then adjusted to a predetermined angle, and the operating member 31 is rotated again to fix the first support assembly 10 and the second support assembly 20. The first support assembly 10 and the second support assembly 20 can be fixed in a car (not shown). If a viewing angle of a user relative to electronic device 200 needs to be changed, the adjusting cap 553 is adjusted to loosen the adjusting plate 70, the connecting member 51, and mating member 53 from each other. The adjusting plate 70 is adjusted, and a positioned of the electronic device 200 is thus changed. After the electronic device 200 is adjusted to a predetermined position, the adjusting cap 553 is adjusted again to fix the adjusting plate 70 between the connecting member 51 and the mating member 53.

The viewing angle of the user relative to electronic device 200 can be adjusted by adjusting the operating member 31 and the adjusting cap 553. Therefore, the support frame 100 has a simple structure and can be easily operated to adjust the position of the electronic device 200.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A support frame for supporting an electronic device, comprising:
   a fixing base configured to grasp the electronic device;
   two support assemblies;
   an angle adjusting mechanism connecting the fixing base to the two support assemblies, wherein the angle adjusting mechanism comprises a connecting member, a mating member, and an adjusting assembly; the connecting member is connected to the two support assemblies; the adjusting assembly comprises an adjusting shaft and an adjusting cap engaged with the adjusting shaft, the connecting member and the mating member are sleeved on the adjusting shaft; and
   an adjusting plate sleeved on the adjusting shaft, and positioned between the connecting member and the mating member, wherein each of the support assemblies comprises a support member, a grasping member, and an adjusting member, the grasping member is rotatably mounted on the assembly portion via the adjusting member, the support member comprises a main portion, a hinge portion, and an assembly portion, the hinge portion and the assembly portion are formed on opposite ends of the main portion, and the grasping member is rotatably mounted on the assembly portion via the adjusting member.

2. The support frame of claim 1, wherein the connecting member comprises a base portion, a connecting portion and a support portion extending from opposite ends of the base portion; the connecting portion defines a receiving groove; the two support assemblies are partially received in the receiving groove.

3. The support frame of claim 2, wherein the hinge portion is received in the receiving groove of the connecting member.

4. The support frame of claim 3, further comprising a pivot assembly, wherein the pivot assembly comprises an adjusting pole extending through the hinge portion of each of the two support assemblies and the connecting portion of the connecting member, and an operating member engaged with the adjusting pole.

5. The support frame of claim 2, wherein the connecting member further comprises a restricting end connected to the support portion, the restricting end is substantially hollow semi-spherical; the mating member is substantially hollow semi-spherical, and a diameter of the mating member is smaller than a diameter of the restricting end.

6. The support frame of claim 1, wherein the fixing base comprises a base body and four grasping portions extending at an edge from the base body; the four grasping portions are configured to hold the electronic device.

7. The support frame of claim 6, wherein the adjusting plate forms a plurality of hook portions, and a center portion of the base body defines a plurality of engaging holes for receiving the plurality of hook portions.

8. A support frame, comprising:
   a fixing base;
   two support assemblies;
   an angle adjusting mechanism connecting the fixing base to the two support assemblies, wherein the angle adjusting mechanism comprises a connecting member, a mating member, and an adjusting assembly; the connecting member is connected to the two support assemblies; the adjusting assembly comprises an adjusting shaft and an adjusting cap engaged with the adjusting shaft, the connecting member and the mating member are sleeved on the adjusting shaft;
   an adjusting plate sleeved on the adjusting shaft, and positioned between the connecting member and the mating member, wherein the adjusting cap is adjustable such that the connecting member and the mating member cooperatively grasp the adjusting plate.

9. The support frame of claim 8, wherein the connecting member comprises a base portion, a connecting portion and a support portion extending from opposite ends of the base portion; the connecting portion defines a receiving groove; the two support assemblies are partially received in the receiving groove.

10. The support frame of claim 9, wherein each of the support assemblies comprises a hinge portion, which is received in the receiving groove of the connecting member.

11. The support frame of claim 10, further comprising a pivot assembly, wherein the pivot assembly comprises an adjusting pole extending through the hinge portion of each of the two support assemblies and the connecting portion of the connecting member and an operating member are engaged with the adjusting pole.

12. The support frame of claim 9, wherein the connecting member further comprises a restricting end connected to the support portion, the restricting end is substantially hollow semi-spherical; the mating member is substantially hollow semi-spherical; and a diameter of the mating member is smaller than a diameter of the restricting end.

13. The support frame of claim 8, wherein each of the two support assemblies comprises a support member, a grasping member, and an adjusting member; the grasping member is rotatably mounted on the assembly portion via the adjusting member.

14. The support frame of claim 13, wherein the support member comprises a main portion, a hinge portion, and an assembly portion, the hinge portion and the assembly portion are formed on opposite ends of the main portion; the grasping member is rotatably mounted on the assembly portion via the adjusting member.

15. The support frame of claim 8, wherein the fixing base comprises a base body and four grasping portions extending from an edge of the base body.

16. The support frame of claim 15, wherein the adjusting plate forms a plurality of hook portions, and a center portion of the base body defines a plurality of engaging holes for receiving the plurality of hook portions.

\* \* \* \* \*